(12) United States Patent
Sun et al.

(10) Patent No.: US 9,321,176 B1
(45) Date of Patent: Apr. 26, 2016

(54) SYSTEMS AND METHODS FOR PLANNING A ROBOT GRASP BASED UPON A DEMONSTRATED GRASP

(71) Applicants: Yu Sun, Tampa, FL (US); Yun Lin, Tampa, FL (US)

(72) Inventors: Yu Sun, Tampa, FL (US); Yun Lin, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 14/676,050

(22) Filed: Apr. 1, 2015

Related U.S. Application Data

(60) Provisional application No. 61/973,579, filed on Apr. 1, 2014.

(51) Int. Cl.
*B25J 9/16* (2006.01)
*B25J 15/00* (2006.01)
*B25J 15/10* (2006.01)

(52) U.S. Cl.
CPC ............ *B25J 9/1656* (2013.01); *B25J 15/0009* (2013.01); *B25J 15/0028* (2013.01); *B25J 15/103* (2013.01); *Y10S 901/39* (2013.01)

(58) Field of Classification Search
CPC ... G06N 3/008; B62D 57/032; G05D 1/0274; G05D 1/0255; G05D 1/0246
USPC ....................................................... 700/245
See application file for complete search history.

(56) References Cited

U.S. PATENT DOCUMENTS

| | | | |
|---|---|---|---|
| 4,623,183 A | 11/1986 | Aomori | |
| 7,042,184 B2 | 5/2006 | Oleynikov et al. | |
| 7,370,896 B2 | 5/2008 | Anderson et al. | |
| 2003/0090115 A1 | 5/2003 | Kim et al. | |
| 2012/0143374 A1 | 6/2012 | Mistry | |
| 2012/0173019 A1 | 7/2012 | Kim | |
| 2013/0245822 A1 | 9/2013 | Kawanami | |

FOREIGN PATENT DOCUMENTS

WO   2007127723 A2   11/2007

OTHER PUBLICATIONS

Kang, et al. "A robot system that observes and replicates grasping tasks" In proceedings of 5th International Conference on Computer Vision 1995, IEEE, Jun. 23-25, 1995.*
Foreign search report mailed Jul. 14, 2015 for PCT/US/2015/023845.
Kang, et al., A robot system that observes and replicates grasping tasks In proceedings of the 5th International Conference on Computer Vision 1995, IEEE, Jun. 20-23, 1995.
Bernardin, et al., A sensor fusion approach for recognizing continuous human gasping sequences using hidden Markov models, IEEE transactions on Robotics, Feb. 7, 2005, vol. 21, No. 1, ISSN 1552-3098.

(Continued)

*Primary Examiner* — Maceeh Anwari
(74) *Attorney, Agent, or Firm* — Thomas | Horstemeyer, LLP

(57) ABSTRACT

In one embodiment, planning a robot grasp of an object includes determining a grasp type that would be used by a human being to grasp the object, determining a position and orientation of the human being's thumb relative to the object, and planning the robot grasp based upon the determined grasp type and thumb position and orientation.

18 Claims, 13 Drawing Sheets

(56) References Cited

OTHER PUBLICATIONS

Ekvall, et al., Interactive grasp learning based on human demonstration, Proceedings of the 2004 IEEE International Conference on Robotics and Automation (ICRA), IEEE Apr. 26-May 1, 2004, vol. 4.
Aleotti, et al., "Grasp recognition in vitrual reality for robot pregrasp planning by demonstration", IEEE international conference on robotics and automation. 2006.
Amor, et al., "Generalization of human grasping for multi-fingered robot hands", IEEE/RSJ international conference on intelligent robots and systems, 2012.
Cutkosky, Mark, "On Grasp choice, grasp models, and the design of hangs for manufacturing tasks", IEEE transactions on robotics and automation 5(3), 1989.
El-Khoury, et al., "A new strategy combining empirical and analytical approaches for grasping unknown 3D objects", Robotics and Autonomous systems 58(5), 2012.
Ferrari, et al., "Planning optimal grasps", IEEE international conference on robotics and automation, 1992.
Dai, et al, Functional analysis of grasping motion, Intelligent Robots and Systems (IROS), IEEE/RSJ International, 2013.
Butterfass, et al., "DLR-Hand II: Next generation of a dextrous robot hand", IEEE International conference on Robotics and Automation, 2001.
Balasubramanian, et al., "Human-guided grasp measures improve grasp robustness on physical robot", IEEE International conference on robotics and automation, 2010.
Fischer, et al., "Learning techniques in a dataglove based telemanipulation system for the DLR Hand", IEEE international conference on robotics and automation, 1998.
Ekvall, et al., "Grasp recognition for programming by Demonstration", IEEE international conference on robotics and automation, 2005.
Ciocarlie, et al., "Hand posture subspaces for dexterous robotic grasping", the International Journal of Robotics Research, 2009.
Belkin, et at., "Laplacian eigenmaps and spectral techniques for embedding and clustering", NIPS, 2001.
Fisher, RA., "The use of multiple measurements in taxonomic problems", Annals of Eugenics 9(2), 1936.
Le, et al., "Learning to grasp objects with multiple contact points", IEEE international conference on robotics and automation, 2010.
Li, et al., "Data-driven grasp synthesis using shape matching and task-based pruning", IEEE transaction on Visualization and computer graphics 13(4), 2007.
Lin, et al., "Learning grasping force from demonstration", IEEE International conference on robotics and automation, 2012.
Lin, et al., "Grasp mapping using locality preserving projections and Knn regression", International conference on robotics and automation, 2013.
Lin, et at., "Task-oriented grasp planning based on disturbance distribution", International symposium on robotics research, 2013.
Liu, et al., "On quality functions for grasp synthesis, fixture planning, and coordinated manipulation" IEEE transactions on automation science and engineering 1(2), 2004.
Lovchik, et al., "The robonaut hand: A dexterous robot hand for space", IEEE international conference on robotics and automation, 1999.
Marzke, et al., "Evolution of the human hand: approaches to acquiring, analysing and interpreting the anatomical evidence", Journal of anatomy 197(1), 2000.
Napier, JR, "Studies of the hands of living primates", Proceedings of the Zoological Society of London, 1960.
Nguyen, VD., "Constructing Force-closure Grasps", The international Journal of Robotics Research, 7(3), 2015.
He, et al., "Locality Preserving Projections", NIPS, 2003.
Oztop, et al., "Schema design and implementation of the grasp-related mirror neuron system", Biological cybernetics 87(2), 2002.
Kim, Jiwon, "Example-based Grasp adaptation", PhD Thesis, MIT, 2007.
Tegin, et al., "Demonstration-based learning and control for automatic grasping", Intelligent Service Robotics 2(1), 2009.
Tenenbaum, J., "Mapping a manifold of perceptual observations", Advances in neural information processing systems 10: Dept of Brian and Cognitive Sciences, MIT, 1998.
Young, RW., "Evolution of the human hand: The role of throwing and clubbing" Journal of Anatomy, 202(2), 2003.
Zhu, et al., "Synthesis of force-closure grasps on 3-D objects based on the Q distance", IEEE transactions on Robotics and Automation 19(4), 2003.
Zollner, et al., "Towards cognitive robots: building Hierarchical task representations of manipulations from human demonstration", IEEE international conference on robotics and automation, 2002.
Gioioso, et al., "Mapping synergies from human to robotic hands with dissimilar kinematics: an object based approach", IEEE international conference on robotics and automation, 2011.
Heumer, et al., "Grasp recognition with uncalibrated data gloves—a comparision of classification methods", IEEE virtual reality conference, 2007.
Hotelling, H., "Analysis of a complex of statistical variables into principal components" Journal of educational psychology 24(6), 1993.
Hsiao, et al., "Imitation learning of whole-body Grasps", IEEE/RSJ International conference on intelligent robots and systems, 2006.
Hueser, et al., "Learning of demonstrated grasping skills by stereoscopic tracking of human hand configuration", IEEE international conference on robotics and automation, 2006.
Jacobsen, et al., "The Utah/MIT dextrous hand: Work in progress", The international journal of robotics research 3(4), 1984.
Kang, et al., "Toward automatic robot instruction from perception-mapping human grasps to manipulator grasps", IEEE transactions on robotics and automation 13(1), 1997.
Kim, et al., "Physically-based grasp quality evaluation under Pose Uncertainty", IEEE transactions on robotics, 2013.
Kochan, et al., "Shadow delivers first hand", Industrial Robot: An international journal 32(1), 2005.
Kootstra, et al., "Enabling grasping of unknown objects through a synergistic use of edge and surface information", The international journal of robotics research 31(10), 2012.
Napier, JR., "Evolution of the human hand", Proceedings of the royal institution of Great Britain, 1965.
Papazov, et al., "Rigid 3D geometry matching for grasping of known objects in cluttered scenes", The international journal of robotics research 31(4), 2012.
Peer, et al., "Multi-fingered telemanipulation-mapping of a human hand to a three finger gripper", The 17th IEEE international symposium on robot and human interactive communication, 2008.33.
Pollard, NS., "Closure and quality equivalence for efficient synthesis of grasps from examples", The international journal of robotics research, 23(6), 2004.
Ponce, et al., "On computing three-finger force-closure grasps of polygonal objects", IEEE transactions on robotics and automation 11(6), 1995.
Roa, et al., "Finding locally optimum force-closure grasps" Robotics anc computer-integrated manufacturing 25(3), 2008.
Romero, et al., "Modeling and Evaluation of Human-to-Robot mapping of grasps", International conference on advanced robotics, 2009.
Rosales, et al., "Synthesizing grasp configurations with specified contact regions", The international journal robotics research, 30(4), 2011.
Roweis, et al., "Nonlinear dimensionality reduction by locally linear embedding", Science 290(5500), 2000.
Sahbani, et al., "An overview of 3D object grasp synthesis algorithms", Robotics and Autonomous Systems, 60(3) 2012.
Santello, et al., "Postural hand synergies for tool use", The journal of neuroscience 18(23): 10, 1998.
Saxena, et al., "Robotic grasping of novel objects using vision", The International Journal of Robotics Research 27(2), 2008.
Sun, Y., Fingertip force and contact position and orientation sensor, IEEE International conference on robotics and automation, 2011.
Susman, et al., "Hand function and tool behavior in early hominids", Journal of Human Evolution, 1998.

\* cited by examiner

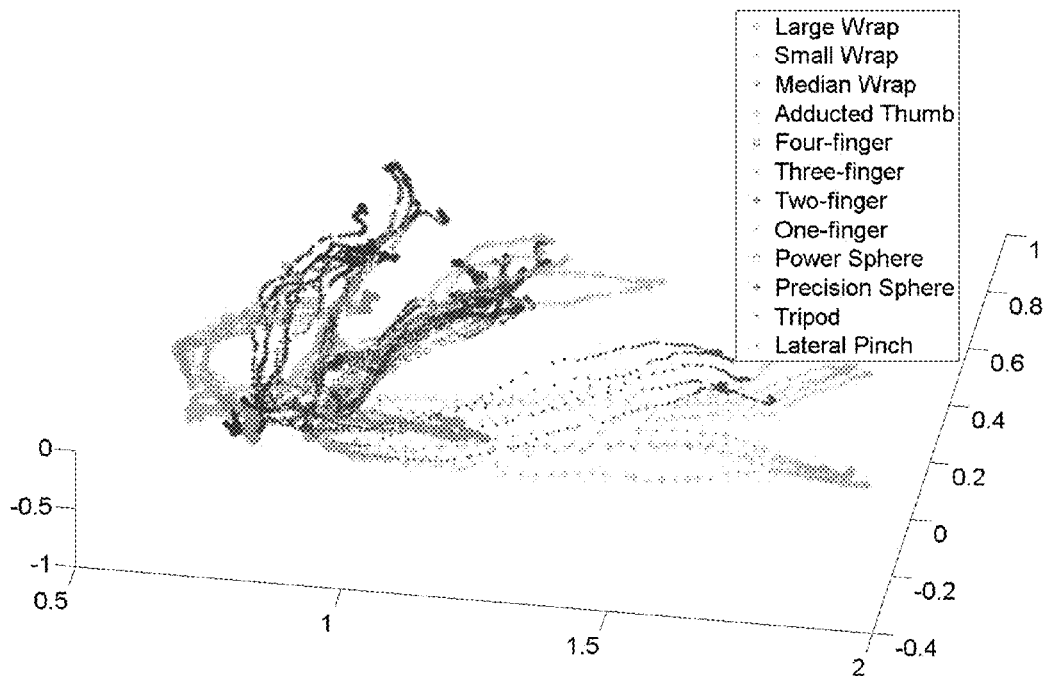
FIG. 3
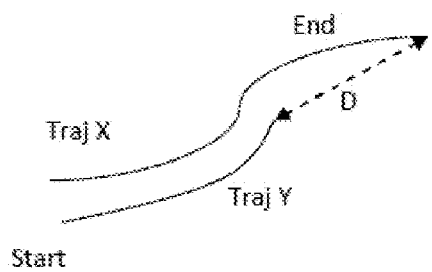
FIG. 4(a)
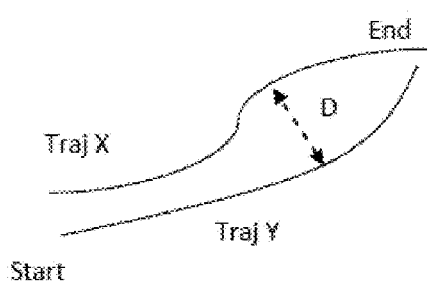 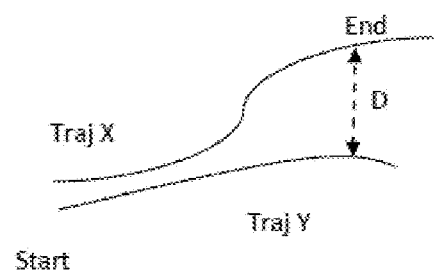
FIG. 4(b)　　　　FIG. 4(c)

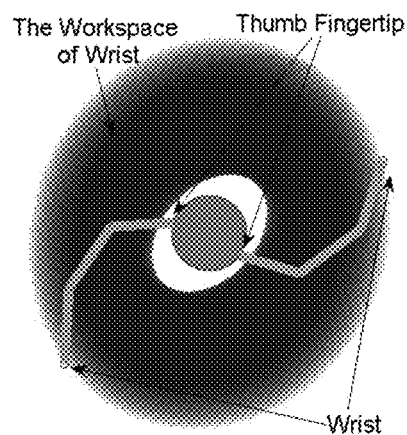
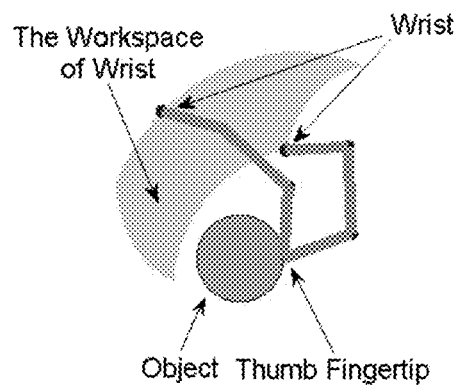
FIG. 7(a)  FIG. 7(b)
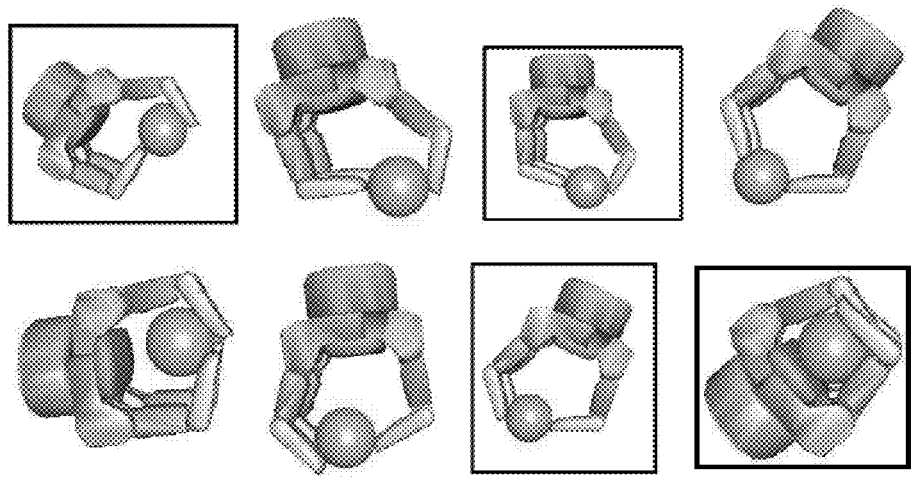
FIG. 8

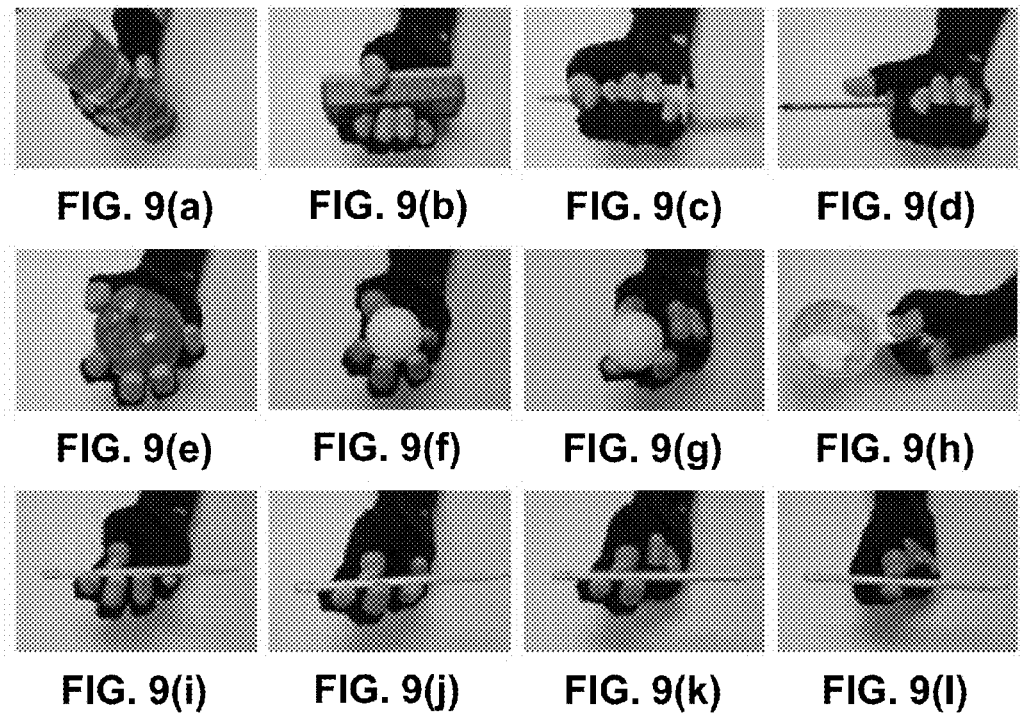
FIG. 9(a)  FIG. 9(b)  FIG. 9(c)  FIG. 9(d)
FIG. 9(e)  FIG. 9(f)  FIG. 9(g)  FIG. 9(h)
FIG. 9(i)  FIG. 9(j)  FIG. 9(k)  FIG. 9(l)
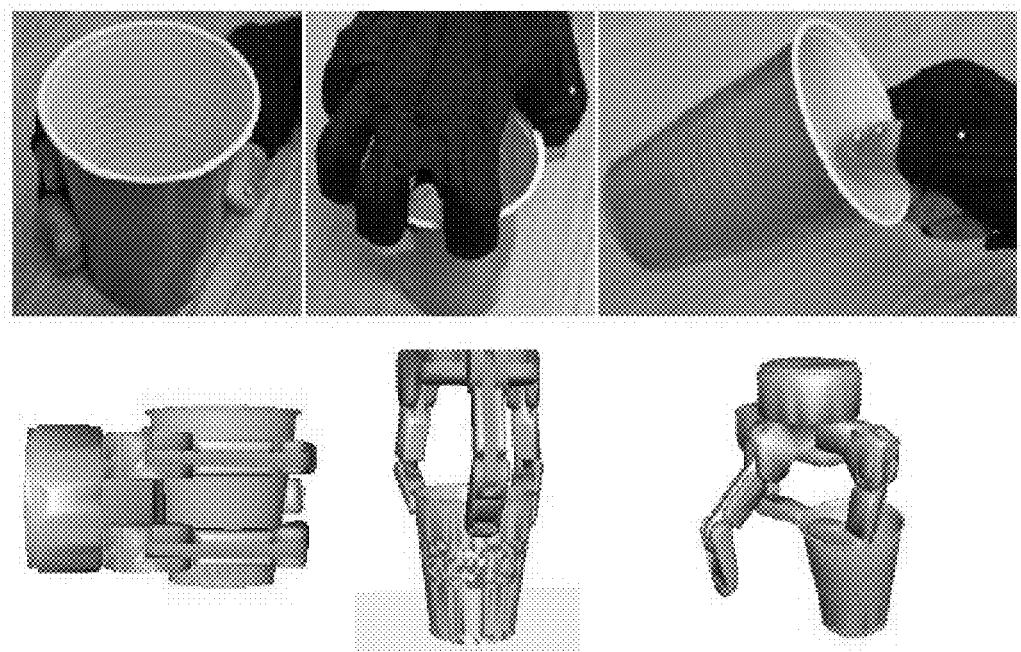
FIG. 10

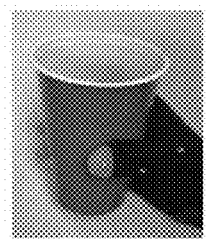 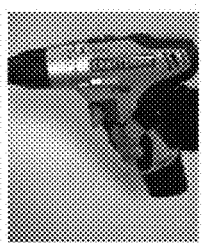 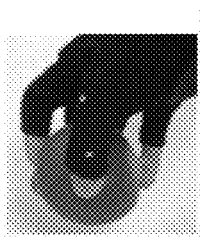 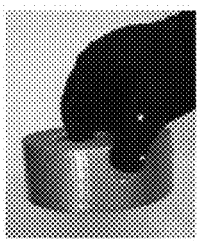 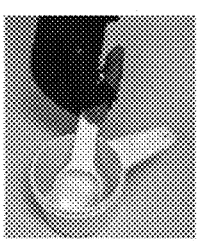
FIG. 12(a)  FIG. 12(b)  FIG. 12(c)  FIG. 12(d)  FIG. 12(e)
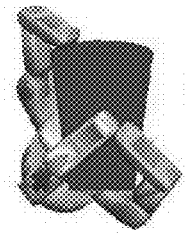 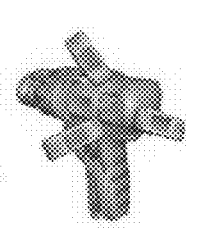 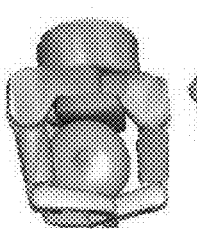 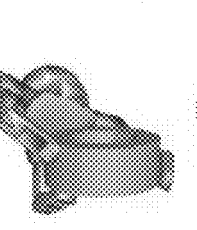 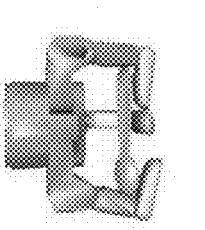
FIG. 12(f)  FIG. 12(g)  FIG. 12(h)  FIG. 12(i)  FIG. 12(j)
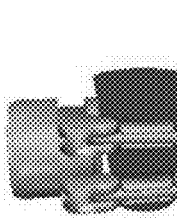 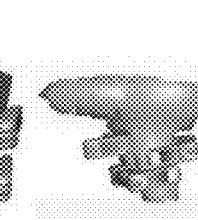 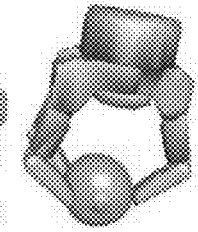 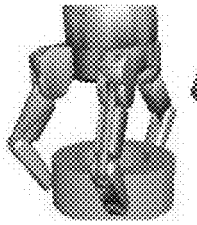 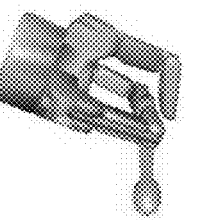
FIG. 12(k)  FIG. 12(l)  FIG. 12(m)  FIG. 12(n)  FIG. 12(o)
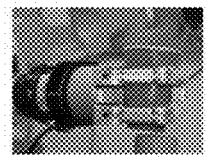  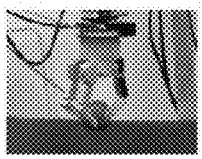 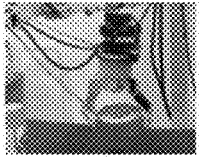 
FIG. 12(p)  FIG. 12(q)  FIG. 12(r)  FIG. 12(s)  FIG. 12(t)

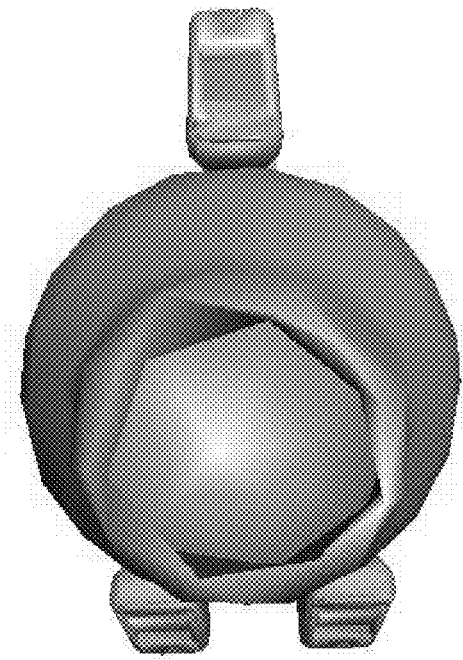 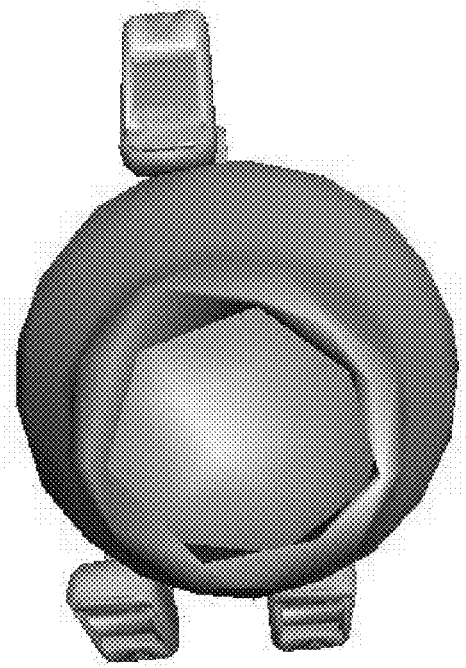
FIG. 16(a)             FIG. 16(b)
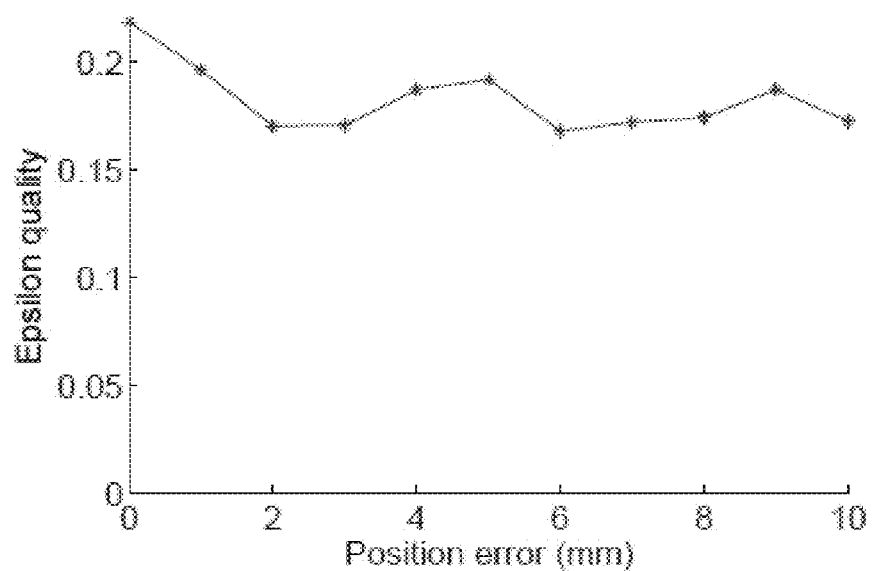
FIG. 17

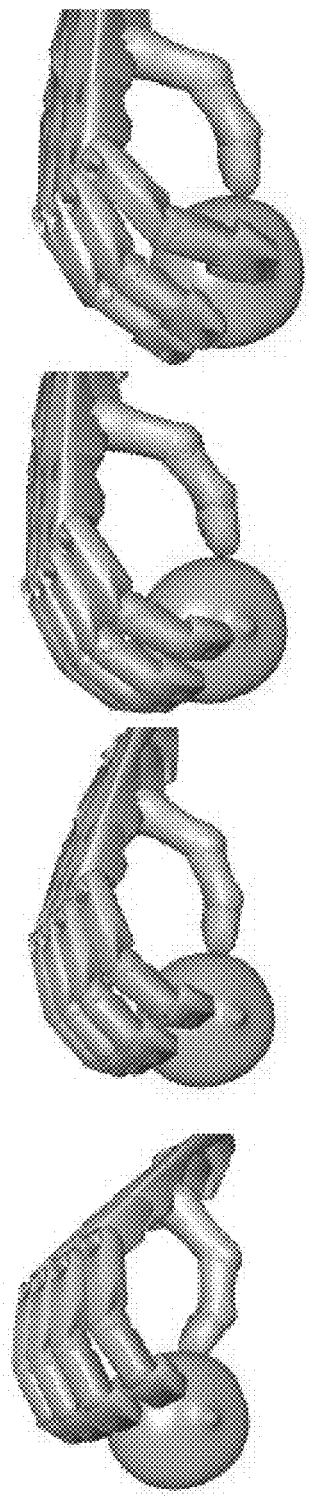
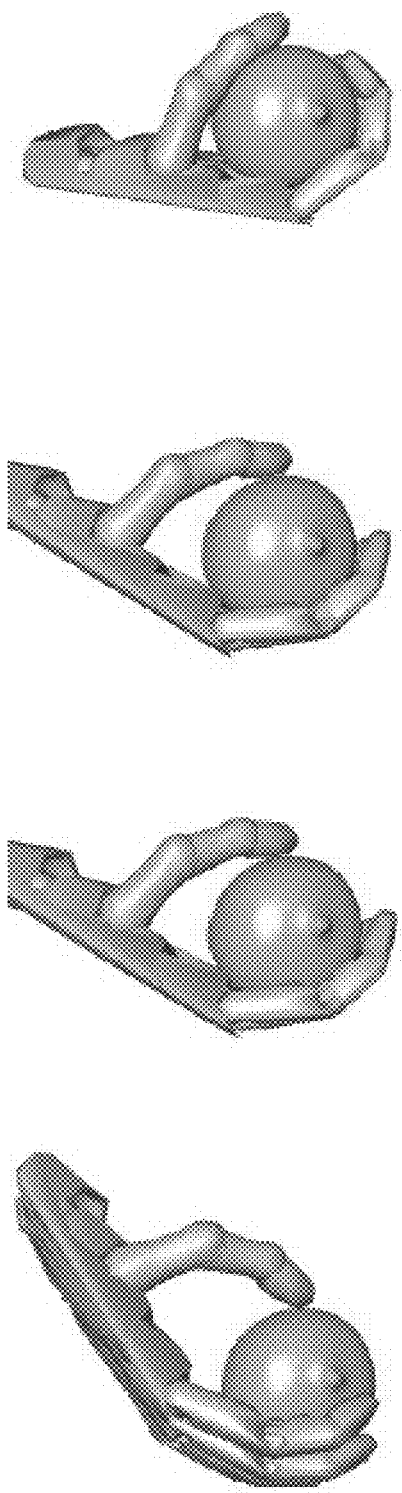
FIG. 18(a)  FIG. 18(b)  FIG. 18(c)  FIG. 18(d)
FIG. 18(e)  FIG. 18(f)  FIG. 18(g)  FIG. 18(h)

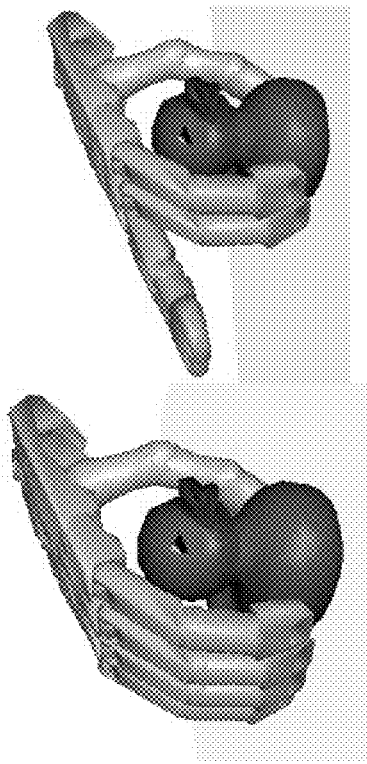
FIG. 19(c)
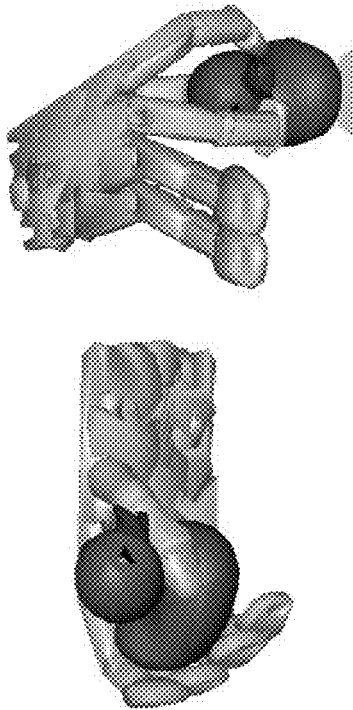
FIG. 19(a) FIG. 19(b)
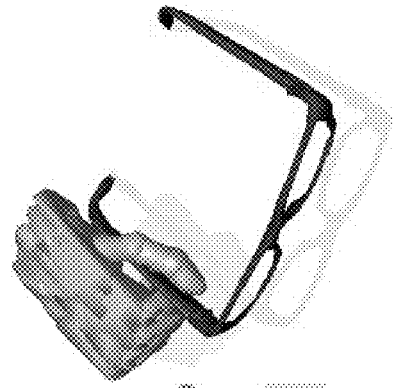
FIG. 19(h)
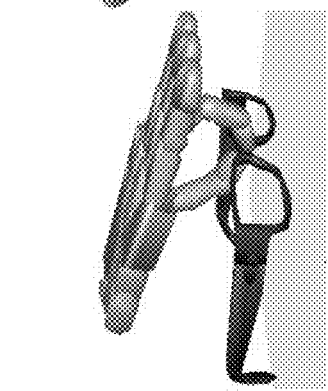
FIG. 19(g)
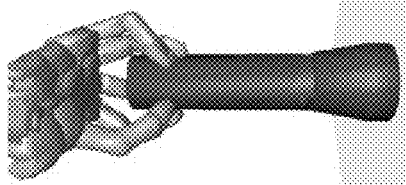
FIG. 19(f)
FIG. 19(d)
FIG. 19(e)

SYSTEMS AND METHODS FOR PLANNING A ROBOT GRASP BASED UPON A DEMONSTRATED GRASP

CROSS-REFERENCE TO RELATED APPLICATION

This application claims priority to U.S. Provisional Application Ser. No. 61/973,579, filed Apr. 1, 2014, which is hereby incorporated by reference herein in its entirety.

BACKGROUND

People apply different grasps to objects in daily life. Those grasps, usually stable grasps that vary from power grasps to precision grasps, are executed for different manipulation purposes. In robotics, grasping problems have been studied for decades. These problems involve finding a grasp of good quality for a robotic hand to execute given an object and a manipulation task. A good quality grasp results from an appropriate placement of contacts on an object. An appropriate contact placement needs to be reachable by suitable wrist location and orientation, and requires proper hand configuration. The solutions to grasp problems can be divided into two areas: grasp planning and learning from demonstration.

Grasp planning uses optimization mathematics to search for the optimal contact placement on an object. The cost function of the optimization is a function of grasp quality measures. Grasp quality usually measures a force-closure property, which measures the capability of a grasp to apply appropriate forces on the object to resist disturbances in any direction and to equilibrate any external wrench. Such classic grasp criteria have been widely used in grasp optimization. However, they are task independent. In many manipulation tasks, such as drinking, writing, and handling a screwdriver, a grasp must be applied in a specific way or on some particular part of the object body for different purposes. Although higher grasp quality measures theoretically indicate better grasp, human grasps result in lower quality measures than grasp planning even though human grasps have a higher success rate. Humans grasp objects in a hand-shape aligned manner with the principal axis of the object and use a low-spread pinch, which leads to lower grasp qualities but a higher success rate. It has been concluded by researchers that the existing quality criteria could not be equivalent to the real grasp quality that humans use to assist their grasps.

It is natural for a robot to learn grasp and manipulation skills from humans because humans can handle the dexterous tasks easily. Humans tend to manipulate an object in an optimal way, in terms of stability and energy conservation, by adjusting their motions and contact forces according the object shape and material hardness. The approach in which a robot learns from observing humans grasp objects is called learning from demonstration (LfD). LfD has been a powerful mechanism for a teaching robot new tasks by observing people's demonstrations without any reprogramming. With the learning results, a robot can mimic human motions by reproducing movements similar to the demonstration. The LfD technique avoids a complex mathematic model for hands and objects, and provides useful task information from the demonstrations. The way of demonstration includes guidance on the robot body and execution on the teacher body. Guidance on the robot body avoids correspondence problems but is less intuitive from the teacher's perspective, because the user would lose a first-hand feeling. It also raises difficulties in the human control of a high dimensional motion of the robotic hand with multi-fingers. In contrast, a demonstration performed by a human body is more intuitive, because it requires much less effort than is needed in controlling a robotic hand. Also, humans have good senses on their own muscles and skin.

While the LfD approach is promising, the correspondence problem has been an impediment due to the kinematic difference between a human and a robot. Mapping from a force-closure demonstrated grasp to a robotic body may result in a non-force-closure robotic grasp because of this correspondence problem.

BRIEF DESCRIPTION OF THE DRAWINGS

The present disclosure may be better understood with reference to the following figures. Matching reference numerals designate corresponding parts throughout the figures, which are not necessarily drawn to scale.

FIG. 3 is a graph that provides a three-dimensional visualization of the high dimensional grasp motion data using locality preserving projections (LPP).

FIGS. 4(a)-4(c) are graphs that illustrate three cases of the Hausdorff distance between two grasp types. FIG. 4(a) shows Case 1 in which trajectory Y is a part of trajectory X, FIG. 4(b) shows Case 2 in which trajectory X and Y meet at the end but differ on the way, and FIG. 4(c) shows Case 3 in which trajectories X and Y go further away until the end.

FIGS. 7(a) and 7(b) are images that respectively illustrate the workspace of the Barrett hand (a) without constraint and (b) with thumb constraint extracted from demonstration.

FIG. 8 includes images of example of robotic hand posture snapshots during a searching procedure.

FIGS. 9(a)-9(l) are images that illustrate twelve human grasp types that were used for training FIG. 9(a) show large wrap; FIG. 9(b) shows medium wrap; FIG. 9(c) shows small wrap; FIG. 9(d) shows adducted thumb; FIG. 9(e) shows power sphere; (f) FIG. 9(f) shows precision sphere; FIG. 9(g) shows tripod; FIG. 9(h) shows lateral pinch; FIG. 9(i) shows four-finger-thumb precision; FIG. 9(j) shows three-finger-thumb precision; FIG. 9(k) shows two-finger-thumb precision; and FIG. 9(l) shows one-finger-thumb precision.

FIG. 10 includes images that identify learning and planning results of three different thumb positions/orientations and grasp types applied on a cup.

FIG. 12 includes images that identify execution results in simulation and on a real robot. FIGS. 12(a)-12(e) show a human demonstration; FIGS. 12(f)-12(j) show grasp planning results without constraints; FIGS. 12(k)-12(o) show simulation results with extracted human strategy; and FIGS. 12(p)-12(t) show real robot executions.

FIGS. 16(a) and 16(b) are images that identify a visible thumb position error of 20 mm in simulation. (a) Original thumb position; and (b) thumb position with a 20 mm error.

FIG. 17 is a graph that shows the epsilon quality measures at different thumb position errors.

FIGS. 18(a)-18(h) are images that identify a procedure of the Shadow hand searching for a power sphere grasp.

FIGS. 19(a)-19(h) are images that identify examples of planning results of the Shadow hand for eight grasp types and thumb positions applied on three objects. The grasp types include (a) Large wrap; (b) Tripod; (c) Four-finger-thumb precision; (d) Two-finger-thumb precision; (e) Adducted thumb; (f) Precision sphere; (g) One-finger-thumb precision; and (h) Lateral pinch.

DETAILED DESCRIPTION

Figures 1, 2:
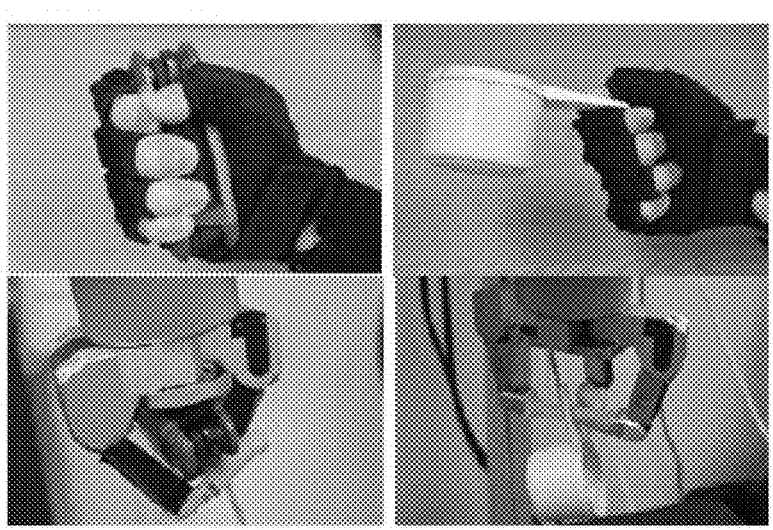
FIG. 1 is a table that identifies grasp quality measures of a Barrett hand when applying different grasp types on a box.
FIG. 2 includes images of corresponding small wrap and lateral pinch grasps of a human hand and a robotic hand. Left: Small wrap grasps for a human hand (top) and a robotic hand (bottom). Right: Lateral pinch grasps for a human hand (top) and a robotic hand (bottom).

As described above, grasp planning and learning from demonstration (LfD) are two methods that can be used to teach a robot to grasp an object. Each of these methods has its drawbacks. An approach combining both methods is possible, however, which can be used to avoid their weaknesses and leverage their strengths. First, the involvement of a human in planning can provide useful information that constrains the planning search space and increases success rate. Second, the approach can be task-oriented, because a human can specify the task properties. Third, it is possible that the correspondence problem can be tackled by learning only partially from the demonstration rather than by performing a full imitation.

An approach is described in this disclosure that integrates LfD, with respect to a task-specific human strategy extracted from demonstration, into planning, with respect to grasp qualities. Generally speaking, the approach involves enabling a user to demonstrate a grasp such that the type of grasp as well as the contact position and orientation of the thumb on the object can be learned from demonstration. The grasp type provides important task-oriented experience in terms of the way that a human grasps an object according to specific task purposes and the thumb position offers a general reference of the body part to be gripped. Thumb orientations provide a constraint on wrist positions and orientations. Hand posture, grasp part, and wrist orientations are key factors of how a target object is manipulated during a task. Grasp types and thumb pose together provide partial constraints to hand postures and wrist positions and orientations. Therefore, they reduce the search space during the optimization procedure. Moreover, since the thumb position of the robot is directly translated from the thumb position of the human demonstrator, no mapping between the two very different kinematic systems is necessary, which avoids the complicated correspondence problem.

A typical method for evaluating grasp quality is to compute force-closure, i.e., the ability of a grasp to resist external forces and moments in any direction. A force-closure property is quantified by the magnitude of the contact wrenches that can compensate for the disturbance wrench in the worst case. The wrench space is decided by contact points. Assuming a hard-contact model of the grasp, i.e., point contact with friction, a grasp consists of n contact points with friction. Let μ be the coefficient of friction between the hand and the object at any contact point. The most common friction model is Coulomb's friction model, which states that slippage is avoided when $f^t \le f^n \mu$, where $f^t$ is the tangential force and $f^n$ is the normal force. According to the model, contact forces are constrained to lie within a cone whose vertex is at the contact point. The cone has an axis of a unit length along the contact normal and a span of $\tan^{-1} \mu$. Each contact can be described by a six-dimensional vector of a wrench space w, which comprises a three-dimensional force vector f and a three-dimensional moment vector τ:

$$w \begin{bmatrix} f \\ \tau \end{bmatrix} \quad \text{(Equation 1)}$$

A total grasp wrench space can be represented by the set of wrench spaces at all contact points: $w_i$, i=1, ..., n, where n is the number of contacts.

The wrench vector is normalized to a unit length. Either the sum of the wrench vector or the contact normal force magnitude can be normalized to 1. The second normalization was implemented in a simulation for computational convenience. Each wrench space can be treated as a six-dimensional point, and the grasp wrench space that can be exerted on the object is given by computing the convex hull of the contact wrenches.

If the origin of the wrench space is in the convex hull, then the grasp is force-closed. To measure how good a force-closure grasp is, two quality measures can be computed with respect to the grasp wrench space. The first grasp quality is the epsilon quality ε, which is the radius of the largest six-dimensional sphere centered at the origin and enclosed with the hull. The epsilon quality refers to the magnitude of the disturbance wrenches that can be compensated by the grasp in the worst case. The larger the epsilon quality is, the more stable the grasp can be in terms of resisting the worst-case disturbance. A grasp with an epsilon quality of 0.1 or greater is considered to be a stable grasp that tends to be robust to uncertainties. The second grasp quality is the volume v of the grasp wrench space, which is invariant to the choice of torque origin.

Without any task-related constraint, such as contact regions of fingertips cared in precision grasps, grasp planning aims to achieve a force-closure grasp given an object rather than task-specific manipulation scenarios so the resulting grasps obtained by optimizing the quality measures are usually power grasps that wrap around the object by the palm and fingers counteracting the external disturbances in any directions. FIG. 1 shows the grasp wrench space projected in the force and torque subspace, as well as the grasp quality measures of a Barrett hand, applying three different grasp types on a box. Comparing the quality measure of the three grasp types, one can find that, in general, the power grasp has the highest grasp quality, since a power grasp is trying to have as many contact points as possible with the object. The precision sphere grasp, in which the fingers are spread around the surface, has a higher quality than the precision grasp, implied by a larger grasp wrench space projected in the torque subspace. The power grasp might not be desirable for some situations, where less power but more dexterity is preferred.

An object can be grasped in different ways or gripped at different locations, depending on specific purposes. One example of different grasping methods of the same object is the procedure for screwing on a jar lid. This starts with a precision grasp using only the fingertips because the jar lid is loose at the beginning and can be screwed efficiently and flexibly without much power. As the jar lid gets tighter, one may switch to a power grasp to apply larger force on the jar lid. Thus, one useful task-specific strategy that can be extracted from a demonstration is the grasp type, which can be recognized by observing humans demonstrating grasps. In this context, the grasp type refers to the manner in which the demonstrator grips an object.

Grasp types provide a referenced hand posture to planning. However, hand posture itself is not enough to form a good task-specific grasp, because a good task-specific grasp can be reached only by combining hand posture with the grasping of the appropriate part of the object. In the situation of handling a cup or manipulating a tool, the handle, rather than other parts of the object, is usually the appropriate part to be gripped. Hence, another useful item of task strategy that can be learned from a human is the grasp part of the object. The grasp part is effective by coupling a suitable hand posture and the relative wrist position. In the disclosed process, a referenced hand posture is learned by recognizing the grasp type, but the grasp part is not learned. Wrist positions and orientations are not directly mapped from the demonstration either, to avoid the correspondence problem that may be caused by mapping. Instead, thumb positions and orientations are extracted relative to the target object as additional information for the grasp planning for several reasons. First, it is known that the thumb plays a key role in grasp and manipulation tasks. All robotic hands can be simplified to a thumb and a virtual finger, which are defined by a set of fingers opposing a thumb. Second, thumb positions and orientations can be easily mapped to a robotic hand by linear transformation. Third, thumb positions and orientations not only provide a good reference of the grasp part on the object, but also the orientation of the hand toward the object. Once the thumb position is determined, the other fingers opposing the thumb can be naturally positioned around the object. Fourth, thumb positions and orientations provide a good constraint for the workspace of the wrist and the other fingers, thereby significantly reducing the search space in the optimization procedure of grasp planning.

Many grasp classifications are defined based on Cutkosky's grasp taxonomy, which classifies user performed grasps into 16 classes that vary by task requirement and dexterities. To recognize the demonstrated grasp to be a type from the Cutkosky's taxonomy, pattern classification techniques can be applied.

Previous work by the inventors has shown that trajectories of the hand joints provide more information than static poses. It is necessary to disambiguate between different grasp types that share similar static poses but differ in grasp trajectories, because some similar poses belonging to different classes in the human hand configuration space may be far apart from each other in the robotic hand configuration space. For example, the lateral pinch and small wrap have similar user-performed grasp poses, whereas, due to much less dexterity in some robotic hands, for example, a Barrett hand, the lateral pinch has to be performed in a way that is distinguishable from the small wrap. This is demonstrated in FIG. 2.

Human hand joint motions can be treated as high dimensional time-series. The noise and variance lying in the motions bring difficulty to the problem, so it is beneficial if features that discriminate motions can be preserved but unwanted variance can be removed. Dimensionality reduction approaches can be used for this purpose, because the high-dimensional hand motions may have a nonlinear manifold in a low-dimensional subspace. For dimensionality reduction, locality preserving projections (LPP) can be used to find the low-dimensional manifold of the training motion data, because it has the strength to easily project the out-of-sample data points to low-dimensional space. Grasp recognition is performed in low-dimensional subspaces.

FIG. 3 shows the three-dimensional visualization of the 14 dimensional hand joint trajectories captured by a data glove for 12 different grasp types in Cutkosky's taxonomy. The figure demonstrates the ability of LPP to preserve the locality of the nonlinear structure. Although there is partial overlapping between two classes, such as the beginning of the motion sequence because the hand is initially open for all grasp types, there are distinguishable variances among different classes of grasp sequences but little in-class variance.

A demonstrated grasp trajectory can be recognized as a grasp type by measuring the similarity between the demonstrated grasp trajectory and the trajectory in the training dataset. The similarity is defined by Hausdorff distance, which can be described as follows. Let X and Y be two motion trajectories. The Hausdorff distance from X to Y is represented as:

$$d_h(X, Y) = \max_{x \in X} \left( \min_{y \in Y} (\|x - y\|) \right) \quad \text{(Equation 2)}$$

where x and y are data points in trajectories X and Y, respectively. The distance from Y to X is represented as:

$$d_h(Y, X) = \max_{y \in Y} \left( \min_{x \in X} (\|x - y\|) \right) \quad \text{(Equation 3)}$$

The distance between the two trajectories X and Y is defined by:

$$D_H(X,Y) = \max(d_h(X,Y), d_h(Y,X)) \quad \text{(Equation 4)}$$

The Hausdorff distance handles three cases of similarity between grasp motion sequences, as illustrated in FIG. 4. The two trajectories start from approximately the same position because they share the same initial pose. FIG. 4(a) demonstrates Case 1, where trajectory Y is roughly a part of trajectory X. This usually happens for the same grasp types but slightly different object sizes. The inter-trajectory distance, therefore, becomes the distance between the end poses of X and Y. FIG. 4(b) demonstrates Case 2, in which the trajectories X and Y share the same start and end points but differ in intermediate paths. This usually happens when the two grasp types are different but share a similar end pose, such as a lateral pinch and a small wrap, which actually span a larger Euclidean volume in robotic hand configuration space. In this situation, the Hausdorff distance is beneficial for distinguishing between two grasp types that share ambiguous grasp poses. Finally, FIG. 4(c) demonstrates Case 3, which is the general case in which trajectories X and Y differ in intermediate paths as well as end points.

The Hausdorff distance can also be modified to other metrics, such as mean pairwise distance, depending on the applications.

The k nearest neighbors (kNN) method can be used to recognize the demonstrated grasp sequence as a grasp type to which the majority of its k nearest neighbors belong.

Grasp planning can be treated as an optimization problem, which searches the maximum value of the high-dimensional quality function Q (either $\epsilon$ or v). The quality measure is determined by contact points of the hand on the object, and contact points are further determined by the hand posture as well as the relative wrist positions and orientations. Therefore, Q can be a function of hand posture and position:

$$Q=f(p,w) \quad \text{(Equation 5)}$$

where $p \in R^D$ is the hand posture and $w \in R^6$ is the position and orientation vector of the wrist. The dimensionality D depends on the degrees of freedom of the robotic hand. For a Barrett hand, D=4 and p is a four joint angle vector:

$$p = \begin{bmatrix} \theta_1 \\ \theta_2 \\ \theta_3 \\ \theta_4 \end{bmatrix} \quad \text{(Equation 6)}$$

where $\theta_1$, $\theta_2$, and $\theta_3$ are three flexion/extension angles of each finger and $\theta_4$ is one abduction/adduction. Therefore, the quality function Q has 10 variables. An optimal algorithm is needed to search in the high 10-dimensional space for maximum value of the quality function Q. In the discussion that follows, it is described how the search space can be reduced to three by teaching relative thumb positions on an object (see FIG. 5).

Figure 6:
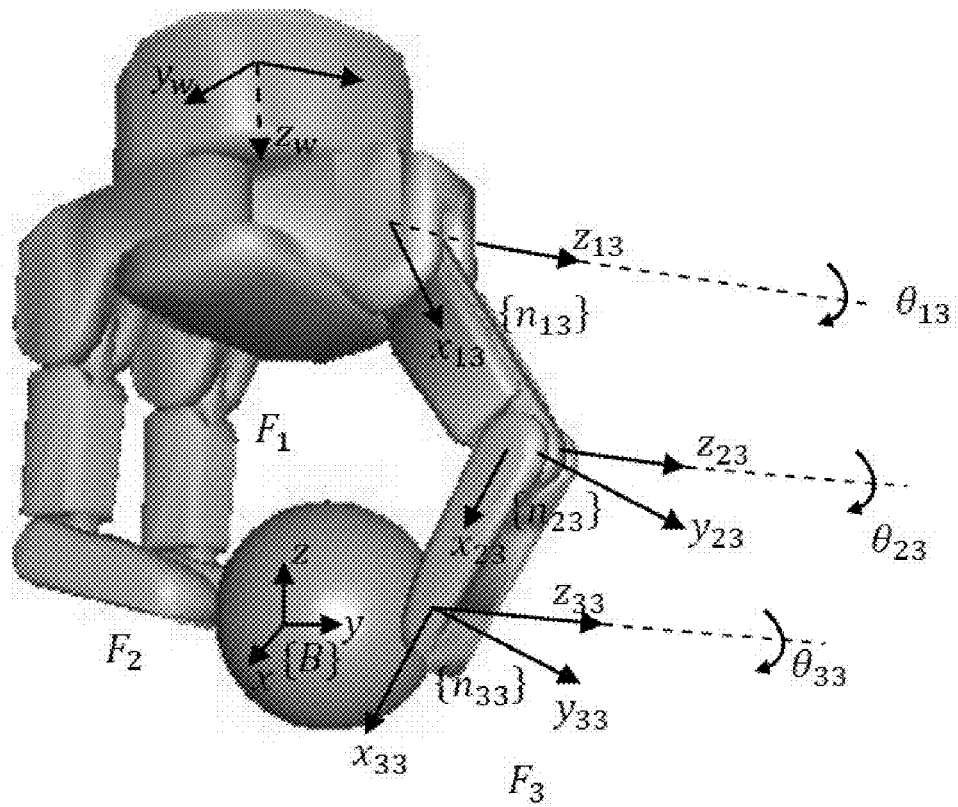
FIG. 6 is an image of a Barrett hand that identifies kinematics of the hand.

FIG. 6 illustrates kinematics of a Barrett hand. The three fingers of a Barrett hand can be referred to as fingers F1, F2, and F3. Let {N} represent a world inertial frame fixed in the workspace. {B} is fixed to the object origin. A frame $\{n_w\}$ is fixed to the wrist of the robotic hand. Frame $\{n_{ik}\}$ with axes $\{x_{ik}, y_{ik}, z_{ik}\}$ is attached to each joint of the robotic hand, where i=1, 2, 3 is the ith joint of each finger, i=3 represents the end effector and k=1, 2, 3 is the kth finger. $z_{ik}$ is the rotational axis of joint ik, $x_{ik}$ is the axis along the link ik's principle axis, and $y_{ik}$ is perpendicular to $z_{ik}$ and $x_{ik}$. Let $\theta_{ik}$ denote the joint displacement rotating around rotational axis $z_{ik}$. Finger F3 is usually defined as the thumb, except for one case when lateral pinch is applied (see experiments described below).

Figure 5:
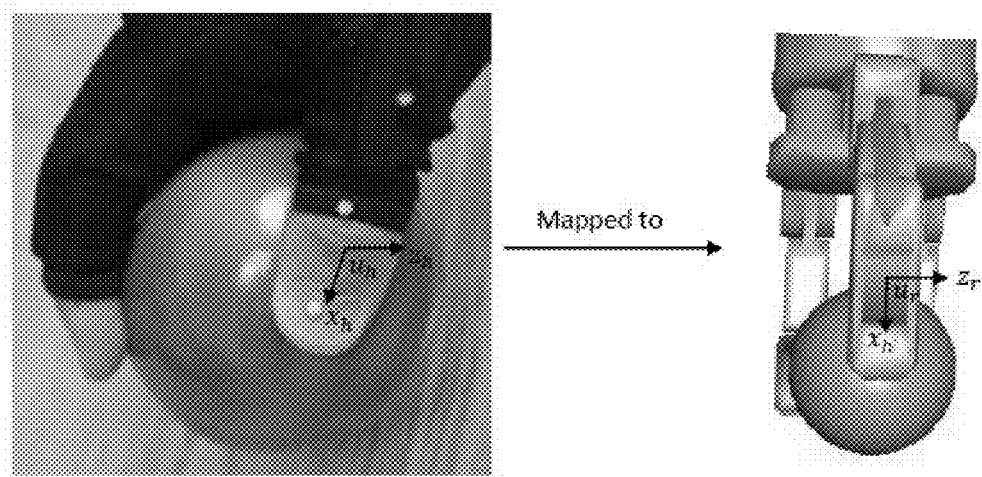
FIG. 5 includes images that illustrate translation of thumb placement from human demonstration to a robotic hand.

Let $u_h \in \mathfrak{R}^6$ denote the vector representing the position and orientation of the center of a human thumb relative to an object coordinate, as shown in FIG. 5. $u_h$ is obtained by a motion capture system from a human demonstration. $u_h$ can be mapped to $u_r$, the center of the thumb fingertip of the robotic hand, by linear translation. Another way of representing the position and orientation of the robot thumb fingertip with respect to {B} is a homogeneous transformation matrix:

$$A_{33} = \begin{bmatrix} R_{33} & d_{33} \\ 0 & 1 \end{bmatrix} \quad \text{(Equation 7)}$$

where $R_{33}$ is the 3×3 rotation matrix and $d_{33}$ is the three-position vector. If all demonstrated thumb positions and orientations are completely mapped to the robotic hand, contact points of the other fingers on the object may vary tremendously caused by kinematic difference; then, a nonforce-closure grasp may be applied by the robot. Therefore, $\theta_{33}$, the pitch of the thumb fingertip relative to the object coordinate, is excluded from the mapping. Hence, the matrix $A_{33}$ is not constant, but varies as the joint displacement $\theta_{33}$ around axis $z_{33}$ adapts to a new value to achieve a force-closure grasp. So, $A_{33}$ is a function of a single joint variable $\theta_{33}$:

$$A_{33}=A_{33}(\theta_{33}) \quad \text{(Equation 8)}$$

Similarly, $A_{i3}$ is the homogeneous transformation matrix of the ith joint with respect to the frame $\{n_{(i+1)3}\}$. Thus, the homogeneous transformation matrix that expresses the position and orientation of the wrist with respect to the thumb fingertip $n_{(i+1)3}$ is denoted by $^{33}T_w$:

$$^{33}T_w = A_{33}(\theta_{33})A_{23}(\theta_{23})A_{13}(\theta_{13})A_w \quad \text{(Equation 9)}$$

where joint angles $\theta_{13}$ and $\theta_{23}$ are moved jointly by one motor. $\theta_{13}$ and $\theta_{23}$ can be determined by the motor-to-joint transform from motor revolution $\theta_3$:

$$\begin{bmatrix} \theta_{13} \\ \theta_{23} \end{bmatrix} = \begin{bmatrix} a \\ b \end{bmatrix} \theta_3 \quad \text{(Equation 10)}$$

The position and orientation of the wrist can be represented as a function of $\theta_{33}$ and $\theta_3$ given by the transformation matrix $^{33}T_w(\theta_{33},\theta_3)$. Therefore, the six position-and-orientation vectors w in Equation 5 can be determined as a function of $\theta_{33}$, $\theta_3$. Combining Equations 5, 6, 9 and 10, Equation 5 is expressed as a function of:

$$Q=f(\theta_1,\theta_2,\theta_3,\theta_4,\theta_{33}) \quad \text{(Equation 11)}$$

$\theta_3$, $\theta_4$, and $\theta_{33}$ determine the position and orientation of the wrist, thumb flexion/extension, and hand adduction/abduction. The flexion/extension of the other two fingers, $\theta_1$ and $\theta_2$, can be easily determined by a simple execution of a close command so that $\theta_1$ and $\theta_2$ are commanded to conform to the surface of the object. Hence, Equation 11 can be simplified as:

$$Q=f(\theta_3,\theta_4,\theta_{33}) \quad \text{(Equation 12)}$$

Mapping only thumb position from a human hand to a robot hand is simple because there is little correspondence problem and it can be easily generalized to different robotic hand models. By learning partial hand information from the demonstration, a reference contact position on the object is known and the search space for optimization during the planning procedure is reduced to three.

FIG. 7 compares the two-dimensional workspace of the wrist with and without a thumb constraint extracted from human demonstration on grasping a ball. In FIG. 7(a), without any constraint, the wrist can move around the circle. In FIG. 7(b), however, with the thumb constraint, the workspace of the wrist is constrained to rotate around only one contact point between the thumb and the object.

The learned grasp type also restrains the configuration space of the robotic hand. The feasible configuration space is bounded by the desired grasp type. In addition, grasp type also affects the number of variables to be optimized. Whether the abduction/adduction angle $\theta_4$ is under planning only for a sphere-type grasp, meaning that an abduction/adduction is needed for a force-closure. In a sphere grasp planning, further simplification can be performed to select one grasp from a set of candidate grasps, by dividing the search procedure into two stages. In the first stage, a search is run on a two-dimensional space, $\theta_{33}$ and $\theta_3$. The adduction/abduction angle $\theta_4$ is searched after $\theta_{33}$ and $\theta_3$ are established to reduce the number of resulting combinations of adduction/abduction angles and flexion/extension angles. Therefore, the computational complexity of the optimization procedure is reduced to $O(n^2)$.

An example of a searching procedure involving a Barrett hand grasping a sphere is presented in FIG. 8, which shows snapshots of the current robot hand posture during optimization. Postures bordered by a black box in FIG. 8 are grasps with an epsilon quality larger than 0.1. During this optimization, the contact point between the thumb and the object remained the same, while the pitch of the thumb changed.

Experiments were performed to test the efficacy of the above-described method. A sequence of human hand motions were measured for grasp type extraction using a right-handed 5DT data glove 14 Ultra with 14 fiber optic-based bend sensors measuring the amount of bending, as shown in FIG. 9. The glove captures proximal interphalangeal (PIP) articulations and metacarpophalangeal (MP) joints for all the five fingers and MP joints between adjacent fingers. The flexure resolution is 12-bit for each sensor, and the minimum dynamic range is 8-bit. The sensor does not measure real joint angles. Instead, it measures the proportion of bending of the measuring joint in its full range of motion. The bending values are scaled in between 0 and 1, with 0 being fully open and 1 being fully closed. Hand motions were sampled at a rate of 100 Hz. The thumb position relative to the object of the demonstration was captured by an OptiTrack Mocap system by placing reflecting markers on the thumb and the object.

The experiments were demonstrated both in a designed robot simulator and on a real robot. Integrated into the program was the C++ library of Open Dynamic Engine (ODE) for collision detection and the QHull library to calculate the convex Hull. A Barrett hand model and eight daily objects were imported into the simulator. The grasp type and the thumb position/orientation were input into the simulator, confining the search space of the planning. Then, the simulator ran the whole optimization procedure to search for the feasible wrist position and hand posture. Wrench space and grasp quality were calculated for each feasible grasp state. When the resulting contact points during the search led to an unexpected grasp type, the corresponding hand posture was eliminated. The simulation results were also tested on real robot system of a Barrett hand equipped with a 6-DOF FANUC LR MATE 200iC robotic arm. The robotic system can be seen in FIG. 12.

During the grasp type recognition phase of the experiment, a user wearing the data glove was first asked to demonstrate a training dataset of all predefined grasp types. Twelve human grasp types were defined, as illustrated in FIG. 9. Then, during the testing process, 15 everyday objects were grasped by the subject. The testing objects varied from the training data set.

For the Barrett hand model, only five grasp types were defined: power grasp, power sphere, precision grasp, precision sphere, and lateral pinch. Power grasp is used when the object is gripped by the both the palm and fingers to get the maximum grip force. Power sphere is similar to power grasp, but it is usually used for sphere objects to enclose the sphere surface with the fingers spread over the surface. Precision grasp and precision sphere are used for less powerful but more dexterous tasks, where the object is gripped by the fingertips. Lateral pinch, also called key pinch, is usually used for small objects, involving the pad of the thumb against the lateral side of the index finger.

These five grasp types were defined for the Barrett hand, which is much fewer than the human hand grasp types, for two reasons. First, a Barrett hand has much less dexterity than a human hand; thus, some grasp types can be grouped into one. For example, four-finger-thumb precision, three-finger-thumb precision and two-finger-thumb precision grasps in Cutkosky's taxonomy can be grouped together as a precision grasp for a robotic model when the two fingers opposite to the thumb are adducted together. Table 1 shows the corresponding grasp types between a human and a Barrett hand. The second reason is that the five grasp types of the Barrett hand decide how the search space of the optimization procedure can be reduced: whether the grasp is a power grasp or not determines whether the object should be in contact with the palm; and whether the grasp is a sphere grasp or not determines whether the search subspace of spread angle can be eliminated. If it is not a sphere grasp, the dimensionality of the search space can be reduced to two by commanding the Barrett hand to adduct completely. Determination of the sphere type is necessary because, in the experiment, it was found that a sphere grasp with a larger spread angle usually has a higher quality measure than a non-sphere grasp type without a spread angle, which is not always a desired grasp type.

TABLE 1

The dictionary of the corresponding grasp types between the human and the robotic hand.

| Human Grasp Types | Robot Grasp Types |
|---|---|
| Large Wrap | Power |
| Medium Wrap | |
| Small Wrap | |
| Adducted Thumb | |
| Power Sphere | Power Sphere |
| Precision Sphere | Precision Sphere |
| Tripod | |
| Four-finger-Thumb Precision | Precision |
| Three-finger-Thumb Precision | |
| Two-finger-Thumb Precision | |
| One-finger-Thumb Precision | |
| Lateral Pinch | Lateral Pinch |

Thumb definition and position are coupled with grasp types. For the first four grasp types (power sphere grasp, power grasp, precision grasp, and precision sphere grasp), F3 in FIG. 6 is defined as the thumb, while in lateral pinch, F3 cannot be defined as the thumb because the other two fingers are not able to be opposed exactly against F3, so F1 is defined as the thumb. Example thumb positions and grasp types are illustrated in FIG. 10 for grasping a cup. The cup was grasped by a medium wrap (left column), a precision sphere (middle column), and a lateral pinch grasp (right column); and the thumb is positioned on the side of the cup, top of the cup, and the inside rim of the cup, respectively.

Experimental results have shown that the recognition rate for single user is around 90%. The recognition is robust for unknown objects with different sizes and shapes. In the experiment, for every single user, a training process is necessary to reach a high recognition rate. For unknown users, calibration is needed to map from data glove sensor values to joint values due to the geometry variance in human hands.

Thumb position can be easily linearly translated to the robotic workspace. In addition to the common errors caused by noisy sensors, errors also exist in the location of the markers because the markers are manually attached to the surface.

In the simulation, the friction coefficient μ was set to be 0.5. The friction cone was approximated by eight-sided pyramid. Thus, each contact point had eight unit wrench vectors. The grasp computation is expensive for a convex hull, so the step size was set to be five degrees for all the angles.

Figure 11:
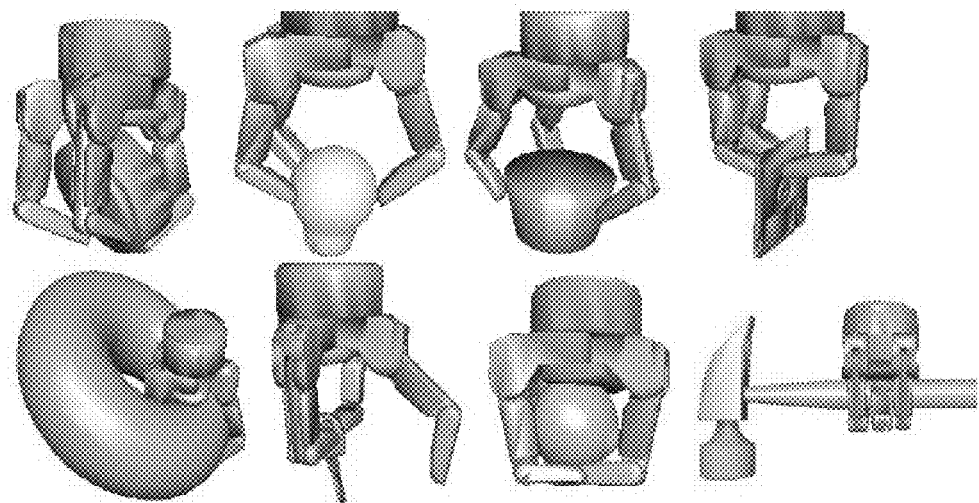
FIG. 11 includes images that identify learning and planning results of eight daily objects in simulation.

Eight daily objects, including vegetables and manipulation tools that comprise basic shapes such as cuboids, spheres, and cones, were tested in the experiments. These basic shapes form the majority of daily objects and manipulation tools. FIG. 11 illustrates the planning results of the eight objects. The ashtray, torus, and hammer were gripped with a power grasp; the bulb and cup were gripped with a precision sphere grasp; the onion was gripped with power sphere grasp; the floppy disk was gripped with a precision grasp; and the key was gripped with a lateral pinch grasp. Without a learning procedure, the optimization would result in a power grasp or a different contact part on the object body. For example, without integrating human strategy, the optimization of the grasp on the hammer would plan a power grasp on the head of the hammer rather than on the handle, which is less desirable in hammer manipulation tasks. Notice that when grasping an ashtray, because a human hand is much smaller than a Barrett hand, although the thumb contact point on the object was the same, the other fingers' contact points changed, resulting in different enclosures on the ashtray.

Five daily objects, i.e., a cup, a drill, an onion, a roll of tape, and a scoop, were also tested on a real robotic system, as shown in FIG. 12. Images in the top row of the figure demonstrate how a human subject gripped each of the five objects in his habitual manner. He wrapped the cup from the side, gripped the drill by the handle with a medium wrap, applied a precision sphere grasp around the onion, applied a precision grasp on the tape, and applied a lateral pinch grasp on the scoop. The planning results without involving any human experience are presented in the second row, in contrast to our resulting grasp solutions shown in the third row. To execute the simulation results on a real robot, as presented in the bottom row, the wrist position and orientation of the robot relative to the target object, as well as joint angles of the fingers, were output from the simulator and commanded to the robot. The real finger joint angles were adapted to real objects by the robot controller to overcome the perception errors of the object and the environment.

As presented in the second row, without any integrations of the human-provided experience, the automatic grasp planning generally resulted in encompassing, yet non-human-style, non-task-specific grasps. In contrast, with the extractions of the grasp strategy from the human demonstration, the robot gripped the object in a human-like manner and on the similar part of the object body. Notice that for grasping the ring-shaped tape shown in the fourth column, the workspace of the Barrett hand excludes the inside area of the tape because of its larger size than that of a human hand. As a result, the robot gripped in a similar grasp type but different body part of the tape.

Precision grasps are vital in dexterous manipulation. Generally, people would first apply a precision grasp with only the fingertips in contact with an object when they pick it up. Then, they perform in-hand manipulation to get a better closure around the object for the subsequent manipulation.

Figure 13A:
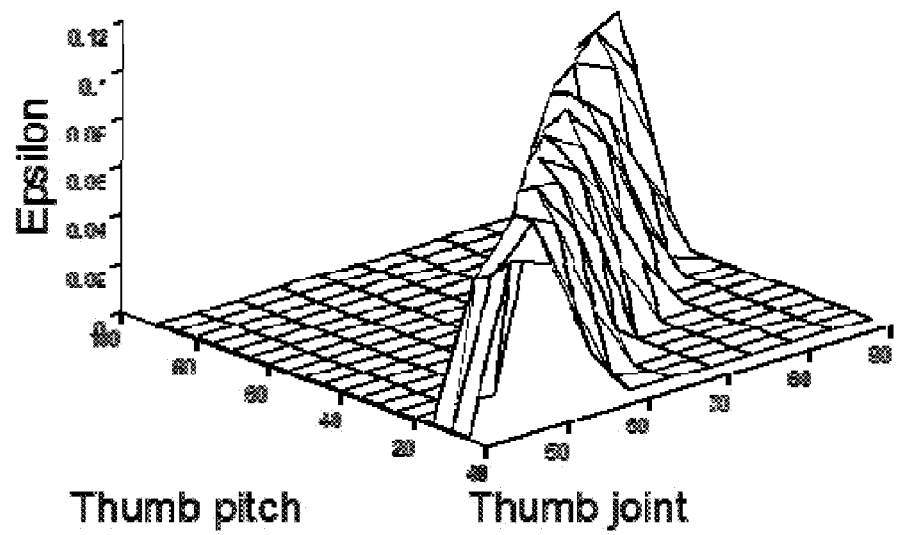
FIGS. 13(a) and 13(b) are graphs that show the grasp quality measures ((a) Epsilon grasp quality; (b) Volume grasp quality) of a precision grasp versus thumb pitch relative to the object and thumb joint angles.
Figure 13B:
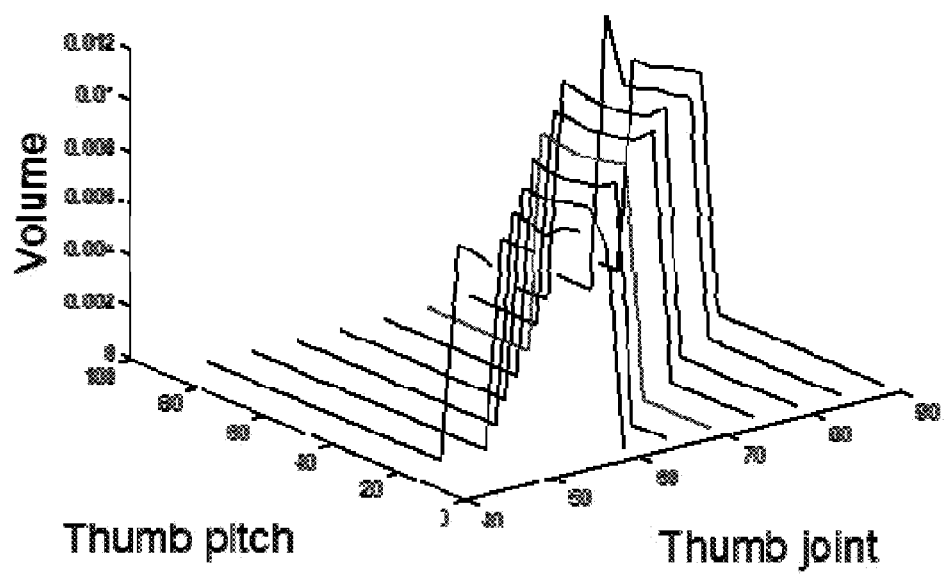
Figure 14:
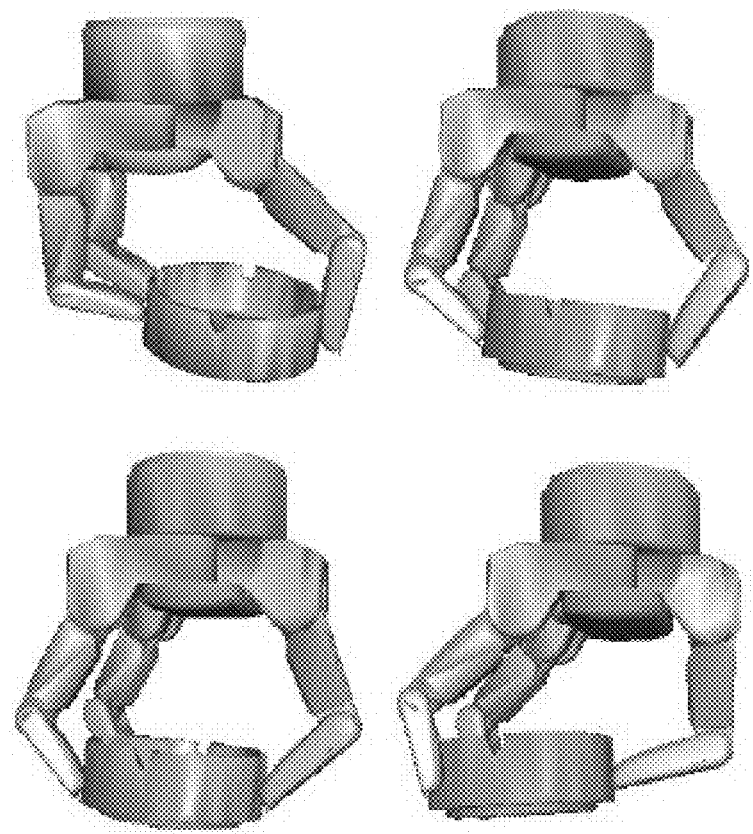
FIG. 14 includes images of four different hand posture along the ridge of the quality measure surface.

FIG. 13 shows the quality measure of a precision grasp optimization involving grasping an ashtray with respect to relative thumb pitch and thumb flexion angle. The ridge shape of the quality measure implies that the planning results in more than one optimal precision grasp quality, indicating a set of compositions of thumb pitch and thumb flexion angle. The postures of different hand compositions are shown in FIG. 14. The resulting grasps indicate a rolling manipulation, where the contact points remain the same but the hand postures vary, demonstrating a manipulation flexibility of the precision grasp resulted from the proposed method.

It is a common problem that uncertainty exists in the perception of human demonstrations, as well as the pose estimation of the object. Noisy sensors also cause errors in perceptions of the shape and pose of an object. In the disclosed method, it is important to study how accurate the perception of human demonstrations and the object needs to be so that the grasp is not broken by uncertainty. Experiments in simulation were conducted to examine how robust the resulting grasps of the proposed method are to resist small perception errors on object geometry and the relative thumb position to the target object. Five objects, including diverse shapes such as a sphere, a box, a cylinder, a torus, and a cone, were tested in the experiment. Only the precision grasp was tested because perception error is of higher concern for precision grasp than power grasp.

Figure 15:
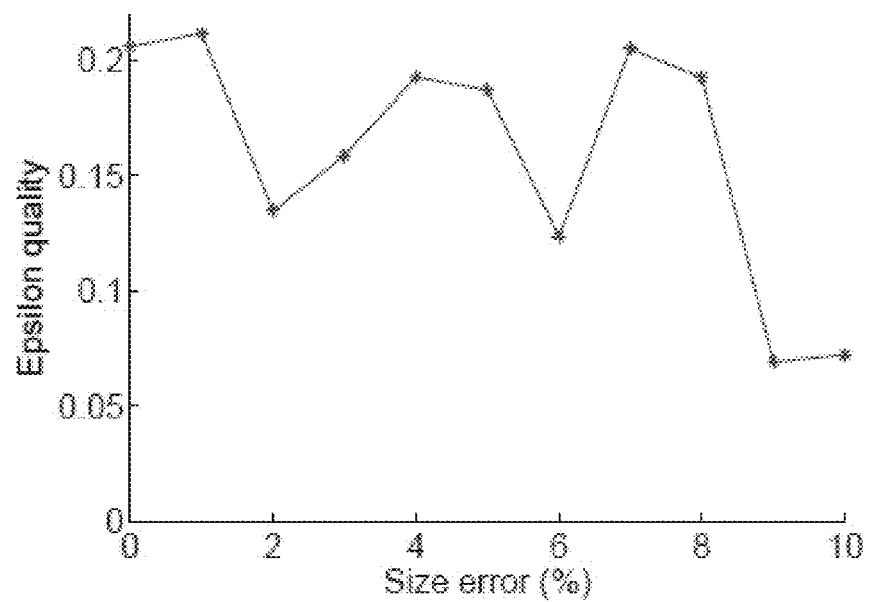
FIG. 15 is a graph that shows the epsilon quality measures at different object size errors.

The introduction of object geometry errors can be implemented by perturbing the object size. FIG. 15 shows the quality measures of a sphere modeled by slightly changing sizes. A sphere was the worst case, among the five tested objects. The results show that the proposed method was robust when the size error was 8% or less. The epsilon quality dropped dramatically when the size error was greater than 8%. Since a grasp is considered to be a stable grasp when the epsilon quality is 0.1 or greater, although there was some error in the grasp qualities, the stability of the grasp was not changed. Thumb position relative to an object is easily shifted in simulation, thereby making it easy to simulate position errors. For example, in FIG. 16, the thumb is shifted slightly to the left of the real position, with a visible position error of 20 mm. FIG. 17 illustrates how the epsilon quality is changed at different thumb position errors from 0 to 10%. According to the result, the grasp is robust to small position errors.

Although real-system experiments were conducted only on the non-anthropomorphic Barrett hand due to the limitation of hardware platform in the lab, integration of grasp type and relative thumb position into grasp planning can be easily generalized to other anthropomorphic hand models. As discussed above, although the extracted strategy of grasp type and relative thumb position/orientation, which provide a referenced grasp posture and a constraint on wrist position, are independent of hand models, the corresponding grasp type in Table 1 of the robotic hand can be changed accordingly. Take the Shadow hand for instance, which is designed to closely approximate the human hand, human grasp taxonomy needs not be simplified. Similar to the Barrett hand, the grasp types defined for the Shadow hand decide the reduced degrees-of-freedom (DOFs) of hand posture p in the objective function of Equation 5, $Q=f(p,w)$, where $p=[\theta_1, \ldots, \theta_D]^T$ is a vector of finger joints, and D is the number of finger joints, such that a desired grasp type is found by the planner. The idea of dimensionality reduction on finger joints was proposed by Santello et al., who performed the principal component analysis on the human hand motion data and revealed that the first two eigengrasps (mainly flexion/extension and adduction/abduction) capture more than 80% variance of the grasp motions, implying a substantial simplification on hand postures. The idea of eigen grasp was applied by Ciocarlie and Allen in grasp planning, where the DOFs of hand and wrist are reduced to eight. The two dominant eigengrasps are sufficient for power grasps, where less dexterity is desired. In dexterous manipulation tasks, however, a different choice of simplified DOFs are needed for precision grasps. For example, as discussed above, a set of candidate grasps resulting from the planning imply a rolling manipulation. The number of variables to be optimized for each grasp type is summarized in Table 2.

TABLE 2

Number of variables to be optimized for each grasp type.

| Grasp Types | Reduced DOFs |
| --- | --- |
| Large Wrap | 2 |
| Medium Wrap | |
| Small Wrap | |
| Adducted Thumb | |
| Lateral Pinch | |
| Four-finger-Thumb Precision | |
| Three-finger-Thumb Precision | |
| Two-finger-Thumb Precision | |

TABLE 2-continued

Number of variables to be optimized for each grasp type.

| Grasp Types | Reduced DOFs |
|---|---|
| One-finger-Thumb Precision<br>Power Sphere<br>Precision Sphere<br>Tripod | 3 |

Hand posture p can be described as a function g of the reduced DOFs $e_i$, written as:

$$p = g(e_i), i = 1 \ldots d \quad \text{(Equation 13)}$$

where d<<D is the number of reduced DOFs. The function g and the value of d differ by grasp types. The wrist position can be determined by thumb posture, written as:

$$p = h(e_i, \gamma) \quad \text{(Equation 14)}$$

where $\gamma$ is the thumb pitch relative to the object. Therefore, Equation 5 can be simplified and generalized as:

$$Q = f(e_i, \gamma) \quad \text{(Equation 15)}$$

Large wrap, medium wrap, and small wrap are power grasps without finger abduction; while thumb is placed against the other fingers (rotation and abduction of thumb are fixed). Other joint motions are determined by one DOF: finger flexion/extension. Therefore, there are two variables to optimize. Note that the flexion/extension of each finger is adjusted by the control mechanism of hand posture to be in contact with the surface. Adducted thumb grasp is similar to the aforementioned three grasps, with thumb placed in a different orientation. For the power sphere grasp, two DOFs are necessary to capture both flexion/extension and adduction/abduction angles. An example of power sphere grasp planning is illustrated in FIG. 18, searching through the subspace of relative pitch $\gamma$.

The DOFs representing precision grasp posture can differ depending on the dexterous manipulation tasks. If we consider only grasp or pick-up task, the reduced DOFs are the same as power grasp. For other manipulation tasks, however, such as rotation manipulation of a jar lid and rolling motion in FIG. 14, different DOFs were chosen to characterize the necessary flexibility. Taking into consideration the rolling manipulation for example, flexion/extension motion for the thumb needs to be decoupled from the other fingers.

The tripod grasp has the same DOFs as precision sphere grasp, but ring finger and little finger keep open, without coupling with other fingers. For non-sphere precision grasps (four-, three-, two-, one-finger-thumb precision grasps), one less DOF is needed to characterize the adduction/abduction motion of the four fingers, with the corresponding fingers open. Lateral pinch grasp also requires little dexterity, which grips the object using the pad of the thumb against the lateral side of the index, with the other four fingers closed. Then, only the thumb flexion/extension motion is needed to capture the hand posture. Examples of planning results for eight different grasp types and thumb positions are illustrated in FIG. 19, demonstrating the capability of the proposed approach to plan various grasps for certain manipulation tasks. FIGS. 19(a)-19(d) show large wrap, tripod, four-finger-thumb precision, two-finger-thumb precision grasps applied on a toy duck respectively; FIG. 19(e) demonstrates the adducted thumb grasp on a flashlight, with thumb pressed on the switch; FIG. 19(f) demonstrates a precision sphere grasp for a pick-up task; FIGS. 19(g) and 19(h) are one-finger-thumb precision and lateral pinch on a pair of glasses, varying grasp positions.

Besides dimensionality reduction on hand motions, additional criteria can also be considered in terms of hand capability, configuration of grasp mechanism, transmission efficiency from joint torque to grasp force, etc.

When the size of the robotic hand is different from the human hand, the robotic hand would apply the power grasp in a distinct wrist orientation from the human demonstration. Take a Barrett hand for instance, which is much larger than a human hand; while a human applies a power sphere grasp from the top of an ashtray, a Barrett hand grasps the ashtray from the top wrapping around the bottom (FIG. 11). This grasp cannot be applied in reality when the object is placed on a table. The situation would also happen to a human hand when grasping small objects from a table, where humans usually apply a precision grasp for a pick-up task, though the grasp can be transferred to other types after the pick-up for other manipulation purposes by in-hand manipulation. Similarly, a robot can detect the collision with a table. If no feasible power grasp can be applied because of the penetration to the environment, no grasp type constraint will be applied. Then, other feasible grasp types are selected alternatively, such as a precision grasp for a pick-up task.

In the foregoing disclosure, it was noted that the limitations of grasp planning can be compensated by learning partially from demonstration. By observing human grasp demonstrations, the type of the grasp is recognized and the contact position of the thumb on the object is mapped to the robot, without any of the correspondence problems that typically exist in LfD. Grasp types import important task-oriented experience to the robot because a human usually applies different grasp types according to the task properties. Grasp types also provide a good referenced hand posture to the robot. The thumb position relative to the object, on the other hand, gives a reference of the contact part of the object body. Both of them highly reduce the workspace of the robot, which speeds up the planning procedure. The approach was tested in a simulation with a Barrett hand model and eight daily objects. It was also demonstrated in the experiment how robust the approach is to perception uncertainties. The presented approach was also evaluated with a real robotic system, to compare with the non-task-specific automatic grasp planning.

The proposed method can be generalized to other robotic models by combining with the dimensionality reduction of a hand model. The size difference of the robotic hand will lead to alteration of the wrist orientation from the demonstrated grasp, thus resulting in a failed grasp for a certain type. Then, the planner needs to find an alternative grasp type in order to have a successful grasp.

In some embodiments, a shape-matching algorithm can be combined with the presented approach for an unknown object. Grasp planning can be performed by matching a similar shape in the database, which collects a set of objects with a labeled thumb contact point and task-specific grasp type.

Although the human grasp can be demonstrated on an actual real-world object, it is noted that the grasp can be demonstrated in a virtual manner. For example, a computer system can model an object that is to be grasped by the robot and a graphical representation of the object can be displayed to a human user. The user can then identify the type of grasp he or she would use to pick up the object and the position and orientation of his or her thumb when grasping the object in that manner. In some embodiments, the grasp type can be input by the user by making an appropriate "grasp type" selection. In other embodiments, the grasp type can be inferred from the user's selection of a particular object model that assumes a particular grasp type. In some embodiments, the thumb position and orientation can be "demonstrated" by the user by marking the graphical representation of the object in a manner that conveys where the thumb would contact the object as well as the orientation of the thumb when such contact is made. The identified grasp type and thumb pose can then be used to search for the optimal robot grasp in the manner described above.

Figure 20:
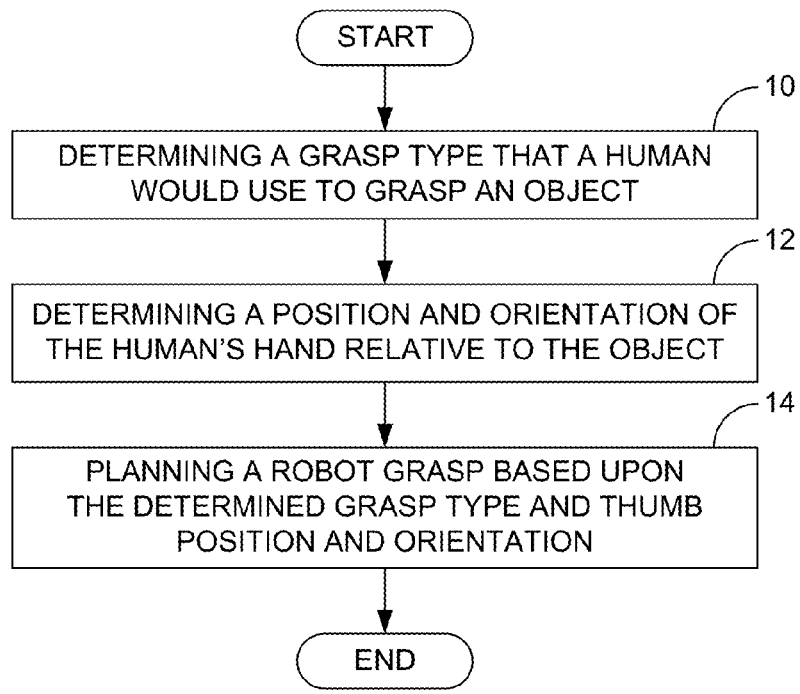
FIG. 20 is a flow diagram of an embodiment of a method for planning a robot grasp.

FIG. 20 is a flow diagram that illustrates a method for planning a robot grasp that is consistent with the above disclosure. Beginning with block 10 of FIG. 20, a grasp type that would be used by a human being to grasp the object is first determined. As described above, the grasp type can be determined by observing a demonstration of a human grasp. For example, an appropriate tracking system can be used to track the articulation of the human's fingers and hand as the human grasps an object for the purpose of performing a particular manipulation (e.g., grasping a coffee cup in order to take a drink from it). In some embodiments, the tracking system can comprise a data glove that captures finger and joint articulations for each of the five fingers. In other embodiments, the tracking system can additionally or alternatively comprise an optical tracking system that tracks the articulation of the fingers/joints and hand. The grasp type can, alternatively, be manually identified to a grasp planning system by a user of the system. For example, the user can be presented with multiple types of objects and grasp types from which he or she can select. The user can be prompted to select the object and grasp type that most closely represent the object that is to be grasped and the grasp type that the user would normally use on the object in order to perform a particular manipulation with it. Irrespective of how the grasp type is determined, knowledge of this grasp type constrains the grasp search space during grasp planning. In particular, only certain types of robot grasps correlate to the determined human grasp so other grasp types can be eliminated from the search space.

Referring next to block 12, the position and orientation of the human being's thumb relative to the object can be determined. As described above, this position and orientation can also be determined from human demonstration. For example, an appropriate tracking system (either the same tracking system described above or an alternative tracking system) can be used to determine both the pose of the thumb and the part of the object that the thumb contacts. In some embodiments, the tracking system can comprise an optical tracking system that optically tracks the thumb. This information significantly constrains the grasp search space used in the optimization procedure of the grasp planning as the thumb position and orientation places a constraint on wrist positions and orientations. Significantly, only the thumb position and orientation are used. Accordingly, while the hand posture is determined from the grasp type, the positions and orientations of the other fingers are not. As noted above, thumb positions and orientations can be easily mapped to a robotic hand by linear transformation and provide not only a good reference of the grasped part on the object, but also the orientation of the hand toward the object because, once the thumb position is determined, the other fingers opposing the thumb can be naturally positioned around the object. In addition, because all robotic hands can be simplified to a thumb and virtual finger, there is no correlation problem arises as when the human fingers must be mapped to the robotic fingers. As with the grasp type, the thumb position and orientation relative to the object can be manually identified to the grasp planning system by a user. For example, the user can mark a graphical representation of the object in a manner that conveys where the thumb would contact the object as well as the orientation of the thumb when such contact is made.

Once the grasp type and the thumb position and orientation relative to the object have been determined, a robot grasp can be planned using that information, as indicated in block 14. During the grasp planning process, the universe of possible robot grasps (grasp search space) is evaluated using an optimization process. A quality measure can be calculated for each possible robot grasp. In some embodiments, the quality measure evaluates the epsilon quality $\epsilon$ and/or the volume $v$ of the grasp wrench space. As described above, the size of the search space is greatly reduced by knowing the grasp type and the thumb position and orientation relative to the object.

Figure 21:
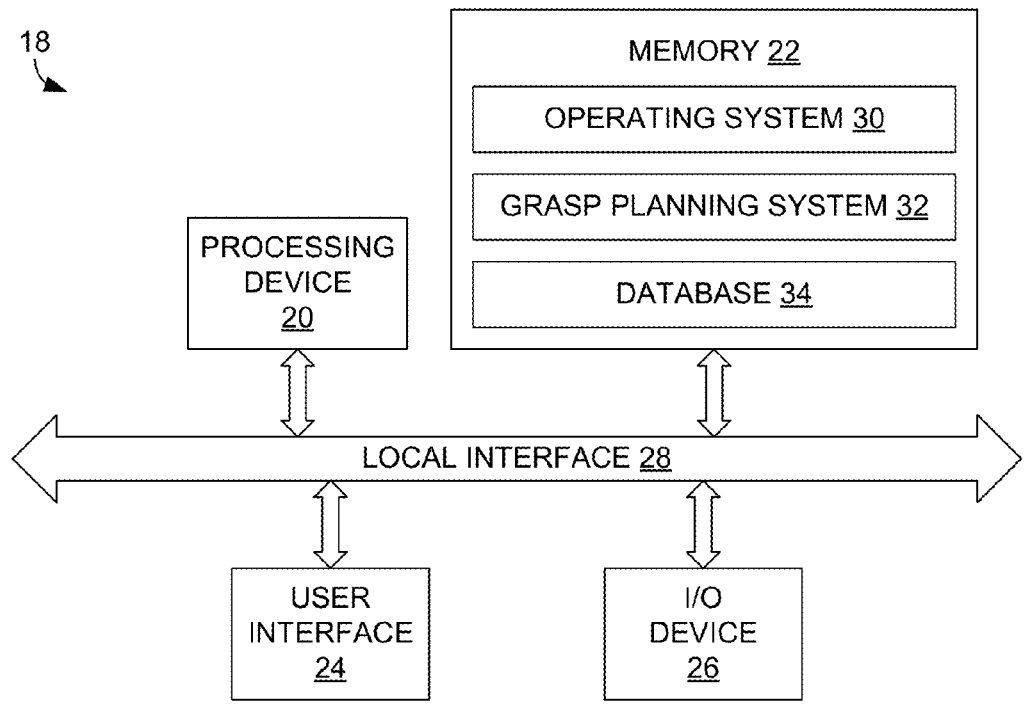
FIG. 21 is a block diagram of an embodiment of a computer system that can be used to plan a robot grasp.

In some embodiments, the dimensionality of the search space can be reduced to two or three. FIG. 21 is a block diagram of an embodiment of a computer system 18 that can be used to plan a robot grasp. As shown in this figure, the system 18 generally comprises a processing device 20, memory 22, a user interface 24, and an input/output (I/O) device 26, each of which is connected to a system bus 28.

The processing device 20 can, for example, include a central processing unit (CPU) that is capable of executing instructions stored within the memory 22. The memory 22 includes any one of or a combination of volatile memory elements (e.g., RAM) and nonvolatile memory elements (e.g., hard disk, ROM, etc.).

The user interface 24 comprises one or more devices with which a user interfaces with the computer system 18. The user interface 24 can, for example, comprise a keyboard, mouse, and display. The I/O device 26 comprises a component that enables the computer 18 to communicate with other devices, such as a tracking system, such as a data glove and/or an optical tracking system (not shown).

The memory 22 (a non-transitory computer-readable medium) stores programs (i.e., logic) including an operating system 30 and a grasp planning system 32. The operating system 30 controls the general operation of the computer system 18, while the grasp planning system 32 facilitates the identification of a robot grasp to use on a particular object that is to be manipulated in a particular way. Also included in memory is a database 34, which can store various robot grasps that are available for use in grasping the object.

The invention claimed is:

1. A method for planning a robot grasp of an object using a computer system, the method comprising:
    the computer system determining a grasp type that would be used by a human being to grasp the object;
    the computer system determining a position and orientation of the human being's thumb relative to the object; and
    the computer system planning the robot grasp based upon the determined grasp type and thumb position and orientation by reducing a size of a grasp search space based upon the determined grasp type and thumb position and orientation without considering the positions and orientations of the human being's other fingers, and searching the search space for a robot grasp that maximizes a quality function.

2. The method of claim 1, wherein determining a grasp type comprises determining the grasp type using a tracking system that tracks the human being's hand when the human being demonstrates grasping of the object.

3. The method of claim 2, wherein the tracking system tracks the human being's hand with a data glove.

4. The method of claim 1, wherein determining a position and orientation of the human being's thumb comprises determining the position and orientation using a tracking system that tracks the human being's thumb when the human being demonstrates grasping of the object.

5. The method of claim 4, wherein the tracking system comprises an optical tracking system that optically tracks the human being's thumb.

6. The method of claim 1, wherein determining a grasp type comprises receiving a selection input by the human being that identifies a grasp type the human being would use to grasp the object.

7. The method of claim 6, wherein determining a position and orientation of the human being's thumb comprises receiving a selection input by the human being that identifies the position and orientation of the thumb relative to a model of the object that is displayed to the human being.

8. The method of claim 1, wherein planning the robot grasp further comprises correlating the determined grasp type to a robot grasp that the robot can perform.

9. The method of claim 8, wherein planning the robot grasp further comprises mapping the position and orientation of the thumb to a hand of the robot.

10. The method of claim 9, further comprising not mapping a position and orientation of any of the human being's other fingers to the robot hand to simplify the mapping process.

11. A system for planning a robot grasp of an object, the system comprising:
 a non-transitory computer-readable memory that stores:
  logic configured to determine a grasp type a human being would use to grasp the object;
  logic configured to determine a position and orientation of the human being's thumb relative to the object; and
  logic configured to plan the robot grasp based upon the determined grasp type and thumb position and orientation by reducing a size of a grasp search space based upon the determined grasp type and thumb position and orientation without considering the positions and orientations of the human being's other fingers, and searching the search space for a robot grasp that maximizes a quality function.

12. The system of claim 11, wherein the logic configured to determine a grasp type comprises logic configured to determine the grasp type from data collected with a tracking system that tracks the human being's hand when a demonstrated grasp is performed.

13. The system of claim 11, wherein the logic configured to determine a position and orientation of the human being's thumb comprises logic configured to determine a position and orientation from data collected with a tracking system that tracks the human being's thumb when a demonstrated grasp is performed.

14. The system of claim 11, wherein the logic configured to determine a grasp type comprises logic configured to receive a selection input by the human being that identifies a grasp type the human being would use to grasp the object.

15. The system of claim 14, wherein the logic configured to determine a position and orientation of the human being's thumb comprises logic configured to receive a selection input by the human being that identifies a position and orientation of the thumb relative to a model of the object that is displayed to the human being.

16. The system of claim 11, wherein the logic configured to plan the robot grasp is configured to correlate the determined type of grasp with a type of robot grasp that the robot can perform.

17. The system of claim 16, wherein the logic configured to plan the robot grasp is configured to map the determined position and orientation of the thumb to the robot but not map a position and orientation of any of the human being's other fingers to the robot hand to simplify the mapping process.

18. A method for planning a robot grasp of an object performed by a computer system, the method comprising:
 the computer system determining a position and orientation of a human being's thumb relative to the object; and
 the computer system planning the robot grasp based upon the determined thumb position and orientation, wherein the planning comprises reducing a size of a grasp search space based upon the determined thumb position and orientation, searching the search space for a robot grasp that maximizes a quality function, and mapping the position and orientation of the thumb to a hand of a robot without mapping a position and orientation of any of the human being's other fingers to the robot hand to simplify the mapping process.

\* \* \* \* \*